UNITED STATES PATENT OFFICE.

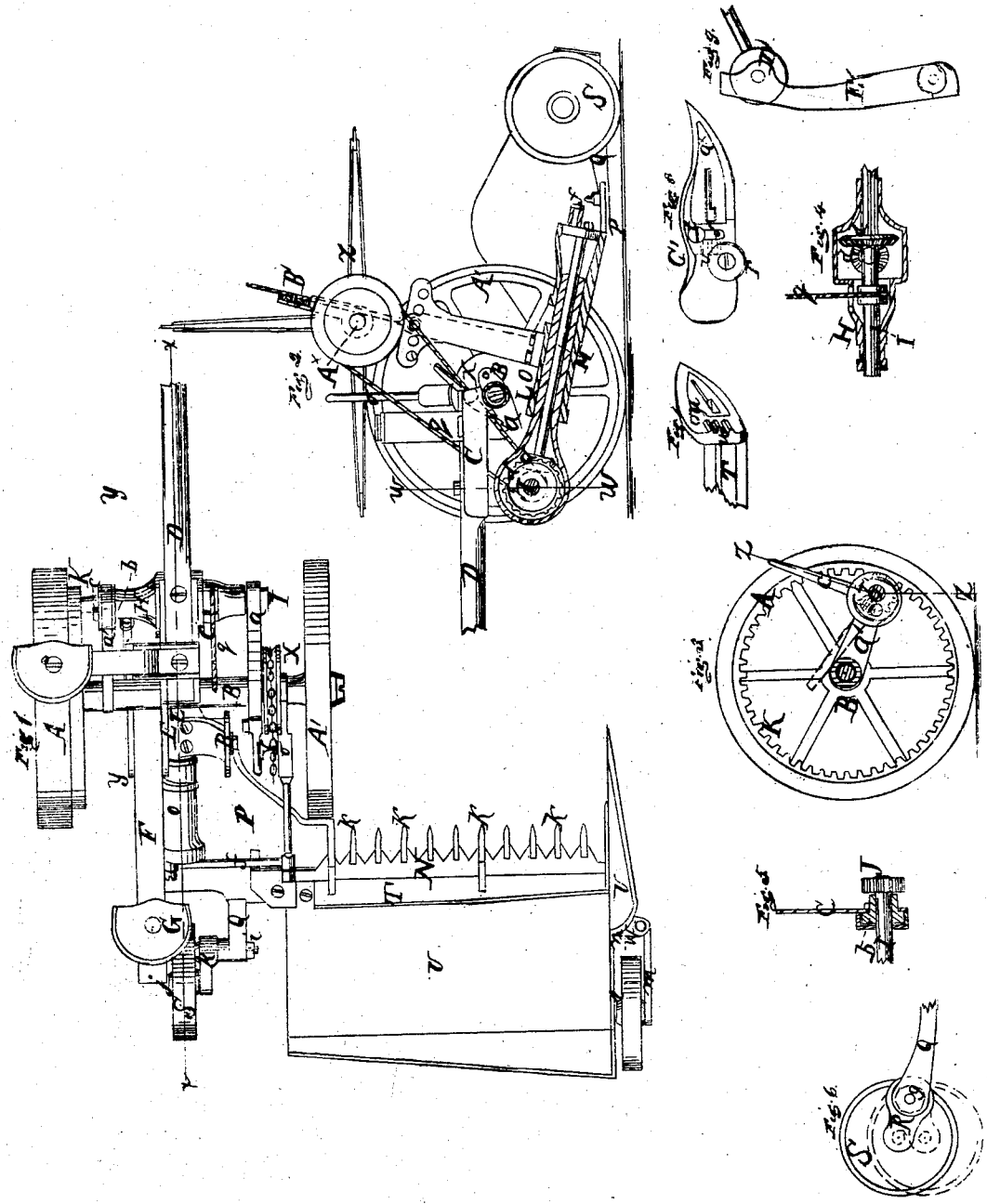

JOHN C. McDOUGAL, OF BLACK ROCK, NEW YORK.

IMPROVEMENT IN HARVESTERS.

Specification forming part of Letters Patent No. 41,384, dated January 26, 1864; antedated January 11, 1864.

*To all whom it may concern:*

Be it known that I, JOHN C. MCDOUGAL, of Black Rock, in the county of Erie and State of New York, have invented a new and Improved Grass-Harvester; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $x$ $x$, Fig. 1; Fig. 3, a section of the same, taken in the line $y$ $y$, Fig. 1; Fig. 4, a section of the same, taken in the line $w$ $w$, Fig. 2; Fig. 5, a section of the same, taken in the line $z$ $z$, Fig. 3; Figs. 6, 7, 8, and 9, detached views of parts pertaining to the same.

Similar letters of reference indicate corresponding parts in the several figures.

To enable those skilled in the art to fully understand and construct my invention, I will proceed to describe it.

A A' are two wheels, which are fitted loosely on their axle B, the latter having a socket, C, projecting from it at right angles, in which a draft-pole, D, is secured. A socket, E, also projects from the axle B at its back part, in which a bar, F, is secured, the latter having a raker's seat, G, on its back end. (See Figs. 1 and 2.) The axle B has two arms, $a$ $a'$, which extend obliquely down from its front side, and have a tube, H, fitted in them at their outer ends. The tube H at one end is fitted directly in the arm $a$, but near its opposite end is fitted eccentrically in a circular plate, $b$, which is fitted in the arm $a$ and is allowed to turn freely therein. This plate $b$ has an arm or handle, $c$, attached to it. Within the tube H there is placed longitudinally a shaft, I, one end of which has a pinion, J, upon it, which, when the machine is at work, gears into a toothed rim K on the wheel A. By turning the plate $b$, through the medium of the arm or handle $c$, the pinion J may be thrown in or out of gear with the toothed rim K. This will be fully understood by referring to Fig. 3, in which the shaft I is shown in a working position in blue and in an idle position in red, the pinion J of course being in gear with K when the shaft I is at work and out of gear when said shaft is idle.

The tube H has a tube, L, projecting from it at right angles. These two tubes may be cast in one piece, and the tube L has a shaft, M, fitted longitudinally within it, the front end of which is connected with the shaft I by bevel-gears $d$ $d$. (See Fig. 4.) On the back end of the shaft M there is placed a crank-pulley, $e$, which is connected by a pitman, $f$, with the sickle N, as shown clearly in Fig. 1.

On the tube L there is fitted a tube, O, which is allowed to turn freely. This tube O has a shoe, P, connected or cast with it, said shoe having a projection, Q, extending out from its back end. This projection has a polygonal hub, $g$, extending out from it at one side, on which an arm, R, is fitted, said arm having a polygonal opening formed in it corresponding with the hub $g$, so that the arm R may be fitted on said hub. The arm R is secured on the hub $g$ by a bolt, $i$, and the outer end of the arm has an axle, $j$, attached, on which a wheel, S, is fitted. By adjusting the arm R on the hub $g$ the shoe P may be secured in a more or less elevated state, as may be required.

T is the finger-bar, which is bolted to the shoe P, and is provided with the usual fingers, $h$, in which the sickle N works.

U is a platform, which is attached to the finger-bar T, and has a divider, V, at its grain end, and also a grain-wheel, the latter having its axis $l$ at the back end of an arm, $m$, the front end of which is fitted in a socket, W, the latter being bolted to the outer side of the divider-plate, or to a vertical plate, $n$, attached thereto. This plate $n$ is perforated with several holes, any of which may be used to receive the bolt of the plate $n$, so as to adjust the grain-wheel U higher or lower, as may be desired.

On the axle B there is placed loosely a wheel, X, which has a handle or arm, $o$, attached to it, and also a chain, Y, the latter being attached to the inner end of the finger-bar T. By turning this wheel X the shoe P and finger-bar may be elevated when desired.

Z represents the reel, the shaft $A^x$ of which is fitted in a suitable bearing, $p$, which is secured to the upper end of an upright, B', on the shoe P. This reel is driven by a belt, $q$, from the shaft I in the tube H.

When the machine is used as a reaper or as a grain-harvester the chain Y is not required. When the machine is used as a mower the platform U is detached, and a shoe, C', to which my invention relates, is secured to the outer end of the finger-bar T. This shoe has a small wheel, $r$, attached to it, and it has a vertical oblong slot, $s$, made in it, through which a screw, $t$, passes into a finger, $u$, at the outer end of the finger-bar. The inner side of the shoe C' has a series of vertical notches, $v$, made in it, which catch into projections $w$ at the outer side of the finger $u$, and the front end of the latter fits into a recess, $a^{\times}$, at the front part of shoe C'. By this arrangement the shoe C' may be adjusted higher or lower, as desired.

The chain Y, when the machine is used as a mower, passes over a pulley, D', at the upper end of an upright, E', the latter being attached to the tube H.

I do not claim any of the parts herein described pertaining to the device when used as a reaper or grain-harvester; but I do claim as new and desire to secure by Letters Patent—

The shoe C', provided with the series of vertical notches $v$ and the vertical oblong slot $s$, in combination with the projections $w$ at the outer side of the finger $u$, all the parts being arranged, as shown, to admit of the adjustment of the shoe C', as set forth.

JOHN C. McDOUGAL.

Witnesses:
WILLIAM RUSSELL,
JAMES L. HAGGART.